No. 758,799. PATENTED MAY 3, 1904.
O. A. TROWBRIDGE.
TESTING DEVICE.
APPLICATION FILED JAN. 22, 1903.
NO MODEL.
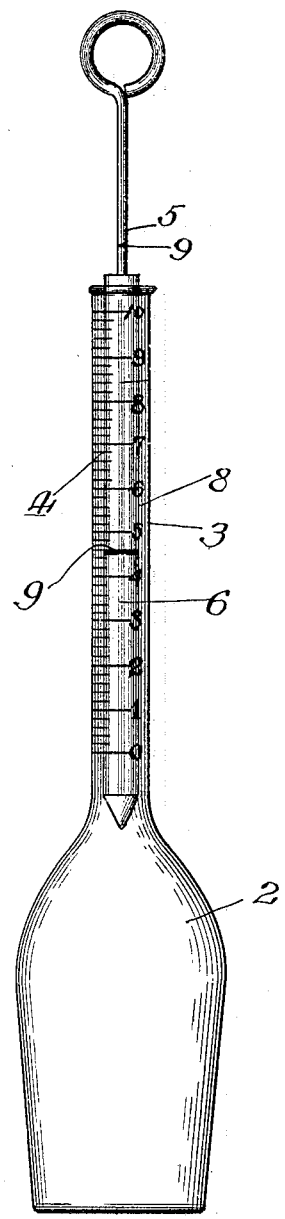
Witnesses:
Inventor:
Orin A. Trowbridge,
By C. Hawley, Atty.

No. 758,799. Patented May 3, 1904.

UNITED STATES PATENT OFFICE.

ORIN A. TROWBRIDGE, OF COLUMBUS, WISCONSIN, ASSIGNOR TO CREAMERY PACKAGE MANUFACTURING COMPANY, OF CHICAGO, ILLINOIS, A CORPORATION OF ILLINOIS.

TESTING DEVICE.

SPECIFICATION forming part of Letters Patent No. 758,799, dated May 3, 1904.

Application filed January 22, 1903. Serial No. 140,133. (No model.)

*To all whom it may concern:*

Be it known that I, ORIN A. TROWBRIDGE, a citizen of the United States, residing at Columbus, Columbia county, Wisconsin, have invented certain new and useful Improvements in Testing Devices, of which the following is a specification.

My invention relates to means for testing the graduations in or upon the necks of fluid-receptacles, such as the well-known Babcock test milk-bottle.

The object of my invention is to provide a simple cheap device by means of which any person may quickly test and verify the graduations upon such bottles.

My invention consists generally in a testing device comprising a handled displacement-section of a determined cubical size and of less diameter than the graduated neck of the bottle or vessel in which it is to be used, whereby upon lowering the displacement-section into the bottle partly filled with liquid the liquid-displacement may be read upon the graduations of the bottle, showing the accuracy or inaccuracy of the graduations.

My invention will be more readily understood by reference to the accompanying drawing, in which the figure illustrates my testing device in use with a Babcock testing-bottle.

The Babcock test-bottle 2 is, as shown in the figure, provided with a slender neck 3, having a scale or graduations 4. The testing device (shown in position in the neck of the bottle) comprises the handle or stem 5 and the displacement-section 6, provided with a gage-mark "9." The cubical contents of the displacement-section are of a standard known volume, and the gage-mark to be used is so placed as to divide this known quantity into equal parts. The handle or stem 5 may also be provided with a gage-mark. The displacement-section may be of any material, but is preferably of a substance impervious to liquids, so that its volume may always remain the same. In place of the gage-mark upon the handle the top of the displacement-section may be used as a gage-mark.

The operation of my invention is as follows: Taking a vessel to be tested, such as the vessel 2 in the figure, the same is filled with fluid, either water or, if it be a milk-bottle, preferably milk, up to the mark "0." The tester is then inserted in the position shown and pushed downward until the lower half of the displacement-section is immersed in the liquid and the liquid rises to the gage-mark "9." When the liquid has risen to the gage-mark, if the bottle is accurately made the liquid will rise to the proper position on the scale 4. To make another test without removing the device from the bottle, the device is still farther lowered into the neck until the upper half is completely immersed and the liquid rises to the upper gage-mark "9" or to the top of the displacement-section, when if the bottle be correct the liquid will rise and reach a higher and the proper level upon the scale 4, as before. If the bottle is not correct, the liquid will rise either above or below the proper indicating-mark on the scale for the immersion of a part or all of the displacement-section, and the test can be relied upon as absolutely accurate, since the volume or cubical contents of the displacement-section is a fixed quantity or of standard known volume.

The very small difference in diameters of the tester and the bottle-neck makes it possible for the tester to be very accurate and minute, the small quantity of liquid around the displacement-section rising and falling with a very slight movement of the tester in or out of the bottle-neck.

Having thus described my invention, I claim as new and desire to secure by Letters Patent—

A testing device for receptacles containing graduated scales for measuring fluid contained in said receptacles, comprising a displacement-section of standard known volume and adapted to be totally immersed in said liquid and a handle therefor whereby the section can be inserted into the liquid, and the same caused to register upon the scale the amount of displacement caused by the displacement-section, substantially as described.

In testimony whereof I have hereunto set my hand, this 16th day of January, 1903, in the presence of two witnesses.

ORIN A. TROWBRIDGE.

Witnesses:
C. G. HAWLEY,
E. G. VREELAND.